(No Model.)
G. S. VALENTINE.
PROCESS OF AND APPARATUS FOR PRESERVING WOOD BY IMPREGNATION TO GIVEN HEIGHTS.
No. 285,087. Patented Sept. 18, 1883.
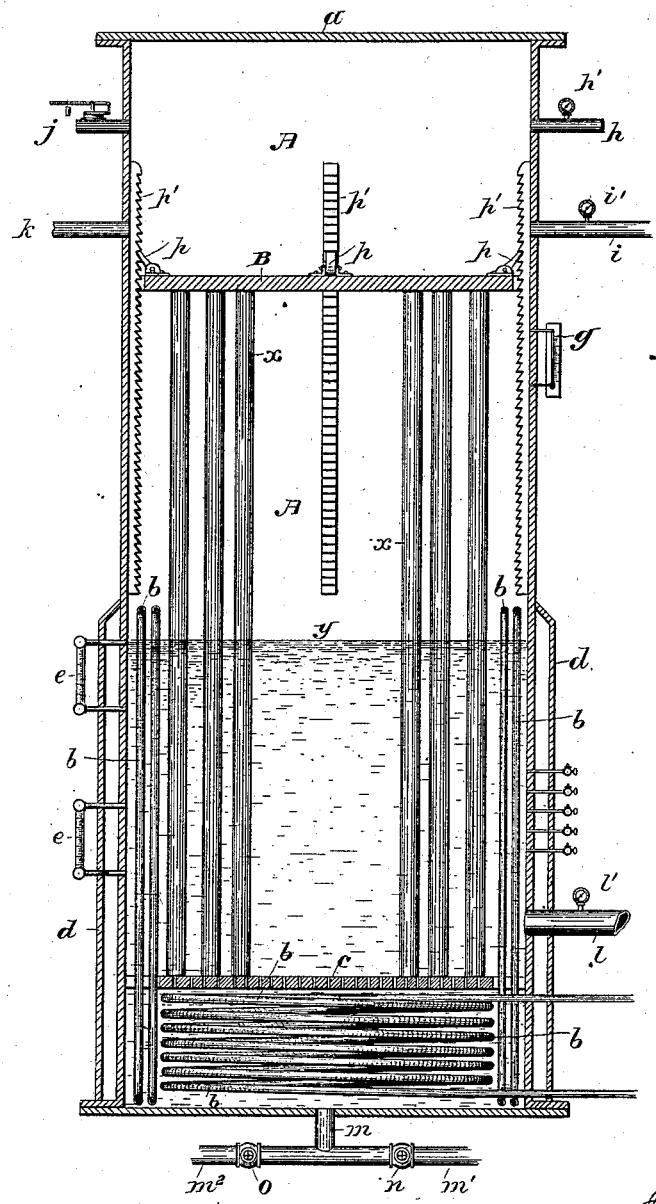

UNITED STATES PATENT OFFICE.

GEORGE S. VALENTINE, OF BROOKLYN, NEW YORK.

PROCESS OF AND APPARATUS FOR PRESERVING WOOD BY IMPREGNATION TO GIVEN HEIGHTS.

SPECIFICATION forming part of Letters Patent No. 285,087, dated September 18, 1883.

Application filed April 16, 1883. (No model.)

*To all whom it may concern:*

Be it known that I, GEORGE S. VALENTINE, of Brooklyn, in the State of New York, have invented certain new and useful Improvements in the Method of and Apparatus for Impregnating Wood with Preservative Fluids, of which the following is a specification.

It is my object in this invention to impregnate with preservative fluids a given portion in length of a stick of timber, in lieu of impregnating the whole stick. In many cases it is only necessary to impregnate a comparatively small portion in length of a piece of timber—as, for instance, in the case of piles it is only necessary to impregnate the upper portion of the pile, or that portion which is not driven into the mud or ground—and the consumer can consequently effect a considerable saving if, instead of paying for the impregnating of a whole stick or pile, he will be required to pay only for the impregnation of that part of it which is to be exposed. It has been my object to devise for this purpose a method of operation and an apparatus adapted to effectuate said method, which shall be at once simple, economical, and efficient. The characteristic feature of my method resides in placing the stick or sticks of timber to be impregnated on end in a closed air-tight receptacle containing creosote or other preservative fluid, in which they are immersed for a portion of their length and to the extent only to which they are to be impregnated, and then subjecting the same to air or steam pressure, which is exerted equally and alike both upon the liquid in which the lower end of the timber is immersed and upon the exposed or unimmersed portion, the pressure within the receptacle being maintained until the preservative fluid has been forced into the timber to the desired height, which will correspond or coincide, substantially, with the level of the liquid in the receptacle. In forcing liquid by pressure into a stick of timber—such, for instance, as a pile—the liquid mainly enters at the end of the stick, but little, if any of it, making its way through the sides, and when, as in the ordinary process of wood-preserving, the stick is laid horizontally, and is entirely submerged in the liquid, the pressure applied on the liquid causes it to enter the stick from both ends. By my method, however, the liquid enters not at both ends, but at one end only, and the pressures on the immersed and unimmersed portions being practically the same, the liquid is prevented from rising higher in the stick than the level of the liquid in the tank, save to the slight extent due to capillary action, which practically need not be taken into account. In the practical operation and use of my invention I have found that the line of demarkation between the impregnated and unimpregnated portions of the timber is clearly and sharply defined, and that this line coincides, to all practical intents and purposes, with the level of the liquid in the tank.

To enable others skilled in the art to understand and use my invention, I shall now proceed to describe more specifically the manner in which it is or may be carried into effect by reference to accompanying drawing, in which I have represented the preferred form of apparatus used by me.

The drawing represents a vertical central section of so much of the apparatus as is needed for the purpose of explanation. A is a strong upright metallic cylinder closed tightly at the top and bottom, the head $a$, which closes its top, being removable, as customary, in order to permit a timber to be put into and taken out from the cylinder. Within the cylinder are the steam-coils $b$, which are placed on the bottom, and also around the sides, of the cylinder up to a certain height, as indicated. The inlet and outlet pipes of the steam-coil are lettered $b'$ $b^2$. Above the bottom coil is a perforated false bottom, $c$, on which rest the lower ends of the sticks to be treated. Surrounding the lower portion of the cylinder is a steam-jacket, $d$, which is intended to be used in connection with the internal coils for heating purposes. The cylinder is provided with glass gage $e$, to indicate the height of the liquid therein, and also with a number of petcocks placed one above the other at short intervals apart—say an inch or two—the object of the last-named devices being to enable the operator to determine with greater exactness the quantity of liquid forced into the timber during the process of treatment. The cylinder is further provided, as usual, with a thermometer, $g$, a pipe, $h$, leading to the vacuum apparatus, a pipe, $i$, leading to the pressure apparatus, a safety-valve, $j$, and a safety or blow-off pipe, $k$. Pipes $h$ and $i$ are provided with a vacuum-gage, $h'$, and a pressure-gage, $i'$, respectively. The pipe through which live steam is discharged into the cylinder for the purpose of preliminarily treating the wood and preparing it to receive the preservative fluid is indicated at $l$, and is provided, as usual, with a steam-gage, $l'$. From the bottom of the cylinder leads the pipe $m$, through which the creosote or other preservative liquid is introduced into and drawn off from the cylinder, and through which is also drawn off the water of condensation and the sap and other watery matters abstracted from the wood by the preliminary treatment. For this purpose pipe $m$, at a point just outside the cylinder, divides into two branches, $m'$ $m^2$, each of which is provided with its own valve or cock, $n$ $o$. To draw off the watery matter, $n$ remains closed and $o$ is opened. To introduce a preservative liquid into or to draw it from the cylinder, $o$ is closed and $n$ is opened.

In order to hold down the timber in place and to prevent it from floating should the depth of the liquid in which it is immersed impart to it any such tendency, I make use of a vertical immovable perforated head, B, which fits and can move easily up and down in the cylinder, and is provided with pivoted dogs $p$, which are so weighted as to automatically fall into engagement with vertical ratchets $p'$, attached to the inside of the cylinder. In practice I use four of these ratchets, placed equal distances from one another, and a corresponding number of dogs. After the sticks of timber to be treated are put in the cylinder, standing on end therein and resting on the false bottom below, the movable head, which, by suitable hoisting apparatus, had been previously raised out of the cylinder and swung to one side, is now brought over the cylinder and lowered therein, descending by reason of its weight until it rests on the upper ends of the sticks or timber, in which position it is firmly held by the dogs, which automatically engage the ratchets. The dogs of course are to be provided with suitable tripping-cords, by which they may be lifted out of engagement with the ratchet whenever it is desired to remove the head, as will be understood without further explanation.

Having described the mechanical construction of the apparatus, I shall now proceed to describe the manner in which I use it in carrying out my process.

The cylinder being open at top and the movable head removed, the piles or sticks to be treated (lettered $x$) are lowered into the cylinder until their lower ends rest on the perforated false bottom. The movable head is then brought above the cylinder and lowered therein until it rests on the upper ends of the piles. The outer head of the cylinder is then put in place and bolted tightly to the cylinder, forming with it an air-tight joint. Heat is now applied to the piles through the intermediary of the heating-coil, as well as by the direct application of live steam, which is injected into the cylinder through pipe $l$, and then, at the proper time, the vacuum-producing apparatus is put in operation, so as to draw off through pipe $h$ the vaporous matters. This preliminary treatment by means of heat and vacuum is the well-known and commonly-employed treatment employed for the purpose of removing sap and moisture from the wood, and of destroying all albuminous matter therein, and it consequently requires no detailed explanation. As soon as this preliminary treatment has been completed, the watery matter being drawn off through branch pipe $m^2$, the latter pipe is closed, pipe $m'$ is opened, and the creosote or other preservative fluid is admitted therethrough into the cylinder in such quantity that it will rise in and fill the cylinder to the height requisite to submerge the portions of the piles to be impregnated, as indicated in the figure, where $y$ represents the level of the liquid thus admitted. Pipe $m'$ is then closed, and air, steam, or vapor is forced by suitable known pressure-producing apparatus into the cylinder above the liquid until the desired degree of pressure has been reached. The effect of the pressure is to force the preservative liquid into the submerged portions of the piles only, as hereinbefore explained, the pressure acting upon both the unsubmerged and submerged portions of the piles, and serving, practically, to keep the line of impregnation at about the level of the liquid in the cylinder. Pressure is maintained until the requisite quantity of preservative liquid has been forced into the submerged portions of the piles, this being readily ascertained and determined with accuracy by observing the glass gages and testing the petcocks. As soon as the desired degree of impregnation has been attained pressure is removed, the preservative liquid is drawn off, the cylinder is opened, the movable head is lifted out, and the piles are hoisted and removed from the cylinder. It will be noticed that in this way I can readily treat a large number of piles at one time.

I remark that the cylinder can be either vertical or inclined at an angle from the vertical. Heat is applied through the intermediary of the steam-coils and external jacket during the impregnating operation, in order to facilitate the said operation.

Having now described my improvement and the best way known to me of carrying the same into effect, what I claim as new and of my own invention is—

1. The hereinbefore-described method of impregnating a given portion in length of piles or sticks of wood with preservative fluids, which consists in standing the same on end in a closed air-tight receptacle containing creosote or other preservative liquid, in which they are immersed for that portion of their length only which is to be impregnated, and then subjecting the same to the pressure of air, steam, or vapor exerted alike both upon the preservative liquid and upon the unsubmerged portions of the timber, said timber, prior to the impregnating operation, being subjected to the preliminary heat and vacuum treatment, for the purpose of abstracting sap, moisture, &c., substantially as and for the purposes set forth.
2. The combination of the cylinder, the vacuum, pressure, and live-steam-supply pipes connected therewith, the internal steam-heating coils, the perforated false bottom for supporting the lower ends of the standing timber, the pipes for admitting preservative liquid and draining off watery matter, and gages and gage or pet cocks for determining the level of the preservative liquid in the cylinder, substantially as hereinbefore set forth.

3. The cylinder and perforated false bottom for supporting the lower ends of the standing timber, in combination with the upper movable head for holding down the timber, and means, substantially as described, carried by the cylinder and head, respectively, whereby the said head is prevented from rising; substantially as and for the purposes hereinbefore set forth.

In testimony whereof I have hereunto set my hand this 4th day of April, 1883.

GEO. S. VALENTINE.

Witnesses:
J. WALTER BLANDFORD,
EWELL A. DICK.